US006766856B1

(12) United States Patent
McGee

(10) Patent No.: US 6,766,856 B1
(45) Date of Patent: Jul. 27, 2004

(54) LARGE PARTICULATE REMOVAL SYSTEM

(75) Inventor: Richard Harvey McGee, Houston, TX (US)

(73) Assignee: Schooner Petroleum Services, Inc., Houston, TX (US)

( * ) Notice: Subject to any disclaimer, the term of this patent is extended or adjusted under 35 U.S.C. 154(b) by 0 days.

(21) Appl. No.: 10/345,543

(22) Filed: Jan. 16, 2003

Related U.S. Application Data

(60) Provisional application No. 60/352,338, filed on Jan. 28, 2002.

(51) Int. Cl.[7] ......................... E21B 21/06; E21B 43/00; C02F 7/00; B01D 21/00; F16K 31/143

(52) U.S. Cl. .................. 166/267; 166/75.12; 166/86.3; 175/206; 175/218; 210/803; 210/747; 210/170; 251/63.5; 137/546

(58) Field of Search ................................ 166/381, 388, 166/369, 75.11, 86.1, 86.3, 88.1, 81.1, 75.15, 99, 267, 75.12; 175/206, 207, 214, 216, 218; 251/63.5; 137/546; 210/800, 803, 201, 805, 747, 170, 251, 513, 532.1

(56) References Cited

U.S. PATENT DOCUMENTS 4,044,834 A * 8/1977 Perkins ....................... 166/370
4,106,562 A * 8/1978 Barnes et al. ............ 166/75.12
4,355,784 A * 10/1982 Cain ........................... 251/63
5,020,610 A * 6/1991 Lyon et al. ................. 175/135
6,394,194 B1 * 5/2002 Queen et al. ................. 175/66
6,432,298 B1 * 8/2002 Carvalko, Jr. ................ 210/86
6,557,577 B1 * 5/2003 Corte et al. .............. 137/15.18
6,641,730 B2 * 11/2003 Poole ......................... 210/300

* cited by examiner

*Primary Examiner*—David Bagnell
*Assistant Examiner*—Jennifer H Gay
(74) *Attorney, Agent, or Firm*—Wendy K. Buskop; Buskop Law Group, P.C.

(57) ABSTRACT

A hydraulic choke for a flow stream from a well with large diameter particulate matter of a finite amount includes an inlet with a defined inlet flow area and a chamber with a defined chamber flow area. The inlet flow area is about ⅓ the size of the chamber flow area. The choke further includes a gate in the chamber surrounded by a housing separated from the chamber wall, a piston for engaging the gate against a seat, a studded outlet in communication with the chamber in the same plane as the inlet, and a studded solids removal outlet in communication with the chamber. The studded solids removal outlet is oriented approximately 90 degrees from the inlet position to permit the large diameter particulate matter to fall from the flow stream and into a solids receptacle for collecting the large diameter particulates matter. The solids receptacle is in communication with the studded solids removal outlet.

13 Claims, 2 Drawing Sheets

24 10 14 16 18 26 50 20 32 28 30 38 42 36 34 40

LARGE PARTICULATE REMOVAL SYSTEM

RELATED APPLICATION

The present application claims priority to Provisional Patent Application Serial No. 60/352,338 filed in the U.S. Patent and Trademark Office on Jan. 28, 2002.

FIELD OF THE INVENTION

An object of the invention is to remove large diameter particulates before they enter the production equipment prior to doing damage to the production equipment using a hydraulic choke mechanism, in particular, the invention relates to the removal of chunks of rock, iron ore, and other debris out of production systems for land based oil and natural gas wells, platform based oil and natural gas wells and subsea oil and natural gas wells.

BACKGROUND OF THE INVENTION

This invention relates to a device and a method for removing large diameter particulates such as rock and iron chunks from a flow stream from a natural gas well or oil well.

A need has existed for a device and method, which can operate at the same pressure as the well. A need has existed for a device that is simple, efficient and inexpensive. Mechanical failures from flowing large diameter debris in a well stream into completion equipment are now frequent, a need has existed to reduce the tremendous maintenance cost and down time during production and drilling of the wells. Many efforts have been made to satisfy these problems in whole or in part, but none is known to have accomplished this inexpensively and efficiently.

With these and other objects in view, which will become apparent to one skilled in the art as the description proceeds, that this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

For purposes of promoting an understanding of the principles of the invention, reference will now be made to the embodiments illustrated in the drawings and specific language will be used to describe it. It will nevertheless be understood that no limitation of the scope of the invention is thereby intended. Alterations and modifications of the illustrated device are contemplated; as are such further applications of the principles of the invention as would normally occur to one skilled in the art to which the invention pertains.

SUMMARY OF THE INVENTION

The invention hydraulic choke for a flow stream from wells with large diameter particulate matter of a finite amount. The hydraulic choke is an inlet with a defined inlet flow area and a chamber having a defined chamber flow area, wherein the inlet flow area is about ⅓ the size of the chamber flow area. The choke also has a gate disposed in the chamber surrounded by a housing separated from the chamber wall and a piston for engaging the gate against a seat. The choke also has a studded outlet in communication with the chamber in the same plane as the inlet and a studded solids removal outlet in communication with the chamber. The studded solids removal outlet is oriented approximately 90 degrees from the inlet and positioned to permit the large diameter particulate matter to fall from the flow stream. The invention also has a solids receptacle for collecting the large diameter particulates matter in communication with the studded solids removal outlet.

The invention is also a method of improving the operation of a hydraulic choke for a natural gas well or oil well. The method begins by flowing a hydrocarbon flow stream from an inlet into a chamber, wherein the inlet flow area is ⅓ the flow area of the chamber flow area, and wherein the chamber contains a gate surrounded by housing for engaging a seat and actuated by a piston. Next, the method entails flowing the flow stream around the housing in the chamber and removing a portion of large diameter particulate matter from the chamber as the velocity of the flow stream is changed from the inlet to the chamber. The method ends by flowing the large diameter particulate matter out of the chamber through a studded solids removal outlet.

BRIEF DESCRIPTION OF THE DRAWINGS

A specific embodiment of the invention will be described by way of example with reference to the accompanying drawings, in which.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention relates to a choke assembly 10, which in the most preferred embodiment is a choke assembly 10 for a flow stream from a natural gas well or an oil well adapted to remove large diameter particulate matter of a finite amount from the flow stream. The large diameter particulate matter can be rock, sand, bits of iron, or other matter that ends up in a well flow.

Figure 1:
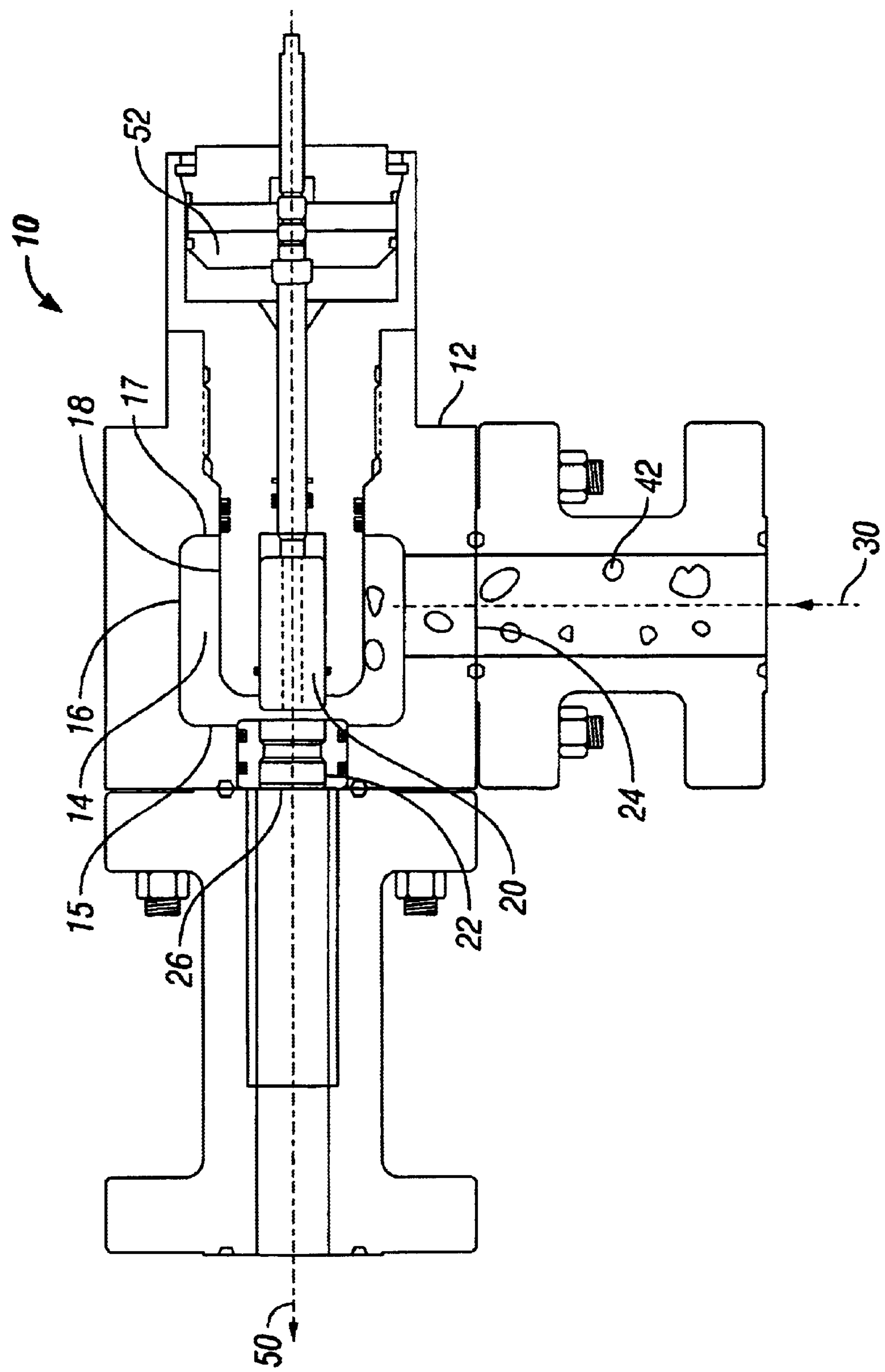
FIG. 1 is a cross sectional view of the choke assembly.

FIG. 1 depicts the choke assembly 10 which is hydraulic in the most preferred embodiment, having a chamber 14 with a chamber wall 16, a first end 15 and a second end 17. An inlet 24 engages chamber 14. The inlet 24 has a defined inlet flow area. The chamber 14 has a specific chamber flow area.

The chamber 14 contains a housing 18 which in turn contains a gate 20 which contacts a seat 22 and wherein the gate is engaged by a piston 52 for partial choking of the flow stream 50. The housing 18 is in a spaced relation from the chamber wail 16. The inlet 24 flow area is most preferably ⅓ the flow area of the flow area of chamber 14.

In chamber 14, the piston 52 operates the gate 20 against a seat 22. By flowing the flow stream 50 from the inlet 24 into the chamber 14, the velocity of the flow stream 50 decreases to 33% of the original flow of the flow stream. The velocity of the flow stream is affected by the change in flow area from the inlet 24 to the flow area of the chamber 14.

Figure 2:
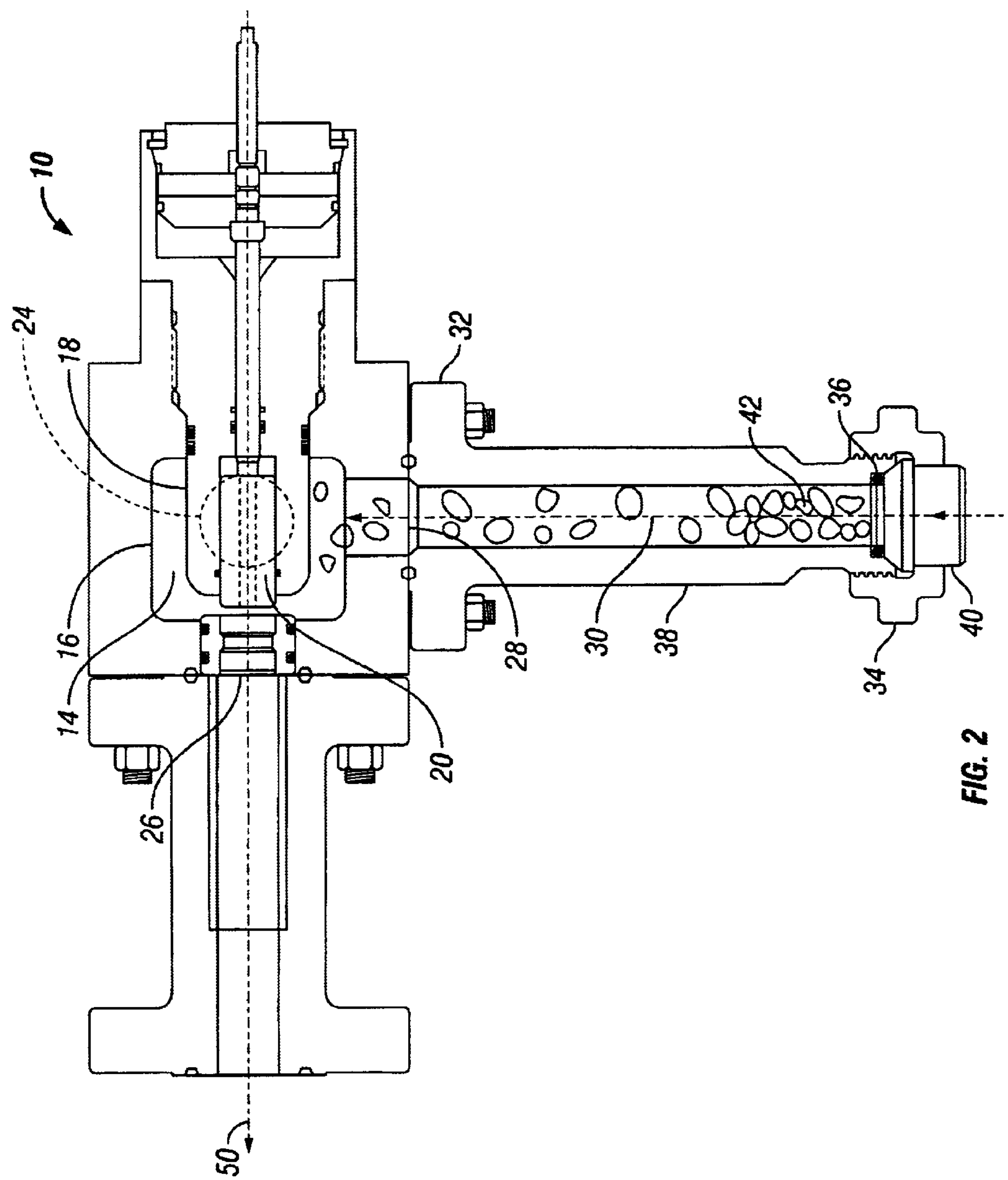
FIG. 2 is another view of the choke assembly of the invention 90 degrees from the view of FIG. 1 showing the large diameter particulate collection components.

FIG. 2 shows the chamber 14 with the inlet 24 in the chamber wall 16 and a studded outlet 26, for flowing the flow stream 50 out of the chamber 14 after large diameter particulate matter is removed.

In the most preferred embodiment the inlet 24 and the studded outlet 26 are in the same plane. In the most preferred embodiment, the inlet 24 is approximately ⅓ the flow area of the chamber 14.

A studded solids removal outlet 28 is connected to the chamber 14 and oriented 90 degrees from the orientation of the inlet 24. The studded solids removal outlet 28 is positioned to permit at least a portion of large diameter particulates 42 to fall from the flow stream 50. A solids receptacle 30 is used for collecting large diameter particulates 42 and is connected to the studded solids removal outlet 28.

Also shown in FIG. 2, the choke assembly 10 can have a flange 32 bolted to the studded solids removal outlet 28, a hammer union connection 34 engages the flange 32. A seal 36 is used to engage the hammer union connection 34. A hammer union straight 38 is secured to the hammer union connection 34. A cap 40 is connected to the hammer union straight.

Although not shown, it is contemplated that up to 8 studs can be used to secure the studded solids removal outlet to the chamber; however a larger or smaller number is contemplated herein.

It is within the scope of the invention that the large diameter particulate matter to be removed can be up to 1 inch in diameter. However, smaller diameter particulates can be removed during this process as well.

This device contemplates removing a finite amount of large diameter particulate matter before manually or automatically dumping the collected particulates. That finite amount is contemplated to be up to 6 cubic feet of large diameter particulate matter. The amount of large diameter particulate matter can be increased by adding a dumping mechanism.

The invention is designed to sustain between 5000 psi and 20,000 psi, and most preferably between 8,000 psi and 15,000 psi of pressure. This invention can be used by a high pressure sustaining hydraulic chokes having a large diameter particulate removal feature.

To accomplish the removal of the particulates, one embodiment of the choke assembly contemplates that the solids removal outlet has a diameter smaller than the diameter of the inlet.

The invention also relates to a method of improving the operation of a choke comprising the steps of: first, flowing a flow stream from a well into an inlet. Second, flowing the flow stream from the inlet to a chamber containing a gate for engaging a seat, and wherein the gate is surrounded by housing. A piston is used to run the gate. The housing is in a spaced apart relation from the walls of the chamber. By changing the velocity of the flow stream from the inlet to the chamber 14, a portion of the large diameter particulates from the chamber can be removed.

Optionally, additional periodic choking to entirely stop the flow stream can be used to remove additional large diameter particulates in the chamber.

Finally, the large diameter particulates are flowed to a solids removal outlet, and the large diameter particulates are collected in a solids receptacle.

This method can be used in a natural gas or oil well, a production well, or a drilling well.

A feature of this invention is that with this arrangement of the parts of the device, and the flowing of the flow stream from the inlet to the chamber changes the velocity of the flow stream to 33% of the original flow which enables large diameter particulate matter to drop from the flow stream.

While this invention has been described with emphasis on the preferred embodiments, it should be understood that within the scope of the appended claims, the invention might be practiced other than as specifically described herein.

What is claimed is:

1. A hydraulic choke for a flow stream from a well having large diameter particulate matter of a finite amount, comprising:

a. an inlet having a defined inlet flow area;

b. a chamber having a defined chamber flow area, in fluid communication with the inlet comprising a chamber wall, a first end, and a second end and wherein the inlet flow area is about ⅓ the size of the chamber flow area;

c. a gate disposed in the chamber surrounded by a housing, and a piston for engaging the gate against a seat, and wherein the housing is separated from the chamber wall;

d. a studded outlet in communication with the chamber in the same plane as the inlet;

e. a studded solids removal outlet in communication with the chamber oriented approximately 90 degrees from the inlet and positioned to permit the large diameter particulate matter to fall from the flow stream; and f. a solids receptacle for collecting the large diameter particulates matter in communication with the studded solids removal outlet.

2. The hydraulic choke of claim 1, wherein the large diameter particulate matter has a diameter of up to 1 inch.

3. The hydraulic choke of claim 1, wherein the large diameter particulate matter is a member of the group consisting of rock, iron pieces, other debris, and combinations thereof.

4. The hydraulic choke of claim 1, wherein the finite amount of large diameter particulate matter has a volume of up to six cubic feet.

5. The hydraulic choke of claim 1, wherein the hydraulic choke sustains pressure between 5000 psi and 20,000 psi during operation.

6. The hydraulic choke of claim 1, wherein studded solids removal outlet has a diameter small than the diameter of the inlet.

7. The hydraulic choke of claim 1, further comprising:

a. a flange secured to the studded solids removal outlet;

b. a hammer union connection engaging the flange;

c. a seal engaging the hammer union connection;

d. a hammer union straight engaging the hammer union connection; and e. a cap connected to the hammer union straight.

8. The hydraulic choke of claim 1, wherein at least eight studs are used in the studded solids removal outlet.

9. A method of improving the operation of a hydraulic choke for a natural gas well or oil well, comprising the steps of:

a. flowing a hydrocarbon flow stream from an inlet having a defined inlet flow area into a chamber having a defined chamber flow area, wherein the inlet flow area is ⅓ the flow area of the chamber flow area, and wherein the chamber contains a gate surrounded by a housing for engaging a seat and actuated by a piston;

b. flowing the flow stream around the housing in the chamber;

c. removing a portion of large diameter particulate matter from the chamber as the velocity of the flow stream is changed from the inlet to the chamber; and d. flowing the large diameter particulate matter out of the chamber through a studded solids removal outlet.

10. The method of claim 9, wherein the natural gas well or oil well is a production well.

11. The method of claim 9, wherein the natural gas well or oil well is a drilling well.

12. The method of claim 9, wherein the velocity of the flow stream is reduced to 33% of its original flow as the flow stream moves from the inlet to the chamber.

13. The method of claim 9, further comprising the step of periodically interrupting the flow stream by using the piston to engage the gate against the seat to stop flow of the flow stream to remove additional large diameter particles.

* * * * *